United States Patent [19]

Maruyama et al.

[11] Patent Number: 4,767,582

[45] Date of Patent: Aug. 30, 1988

[54] METHOD OF MANUFACTURING VOLTAGE NONLINEAR RESISTANCE ELEMENTS

[75] Inventors: Satoshi Maruyama; Kazuo Mukae; Ikuo Nagasawa, all of Kanagawa, Japan

[73] Assignees: Fuji Electric Co., Ltd.; Fuji Electric Corporate Research and Development Ltd., both of Kanagawa, Japan

[21] Appl. No.: 943,803

[22] Filed: Dec. 19, 1986

[51] Int. Cl.[4] ............................................. C04B 35/50
[52] U.S. Cl. ......................................... 264/61; 264/64
[58] Field of Search ................................... 264/61, 64

[56] References Cited

U.S. PATENT DOCUMENTS 4,094,061  6/1978  Gupta et al. ........................... 264/61

Primary Examiner—James Derrington
Attorney, Agent, or Firm—Finnegan, Henderson, Farabow, Garrett and Dunner

[57] ABSTRACT

A method of manufacturing a voltage nonlinear resistance element comprising the steps of providing a mixture of main component ZnO and auxiliary components of at least a rare earth element, Co and B in a mold, placing the mold in a sheath box having openings in the surfaces thereof, and baking the mold in the sheath box. The preferred ratio of the area of the openings in the sheath box to the total surface area of the sheath box is 10-90% to produce the voltage nonlinear resistance elements having favorable long wave tail surge withstanding data and an acceptable ratio of a voltage developed across the terminals of the element when a current of 1 mA flows in the element.

2 Claims, 1 Drawing Sheet

METHOD OF MANUFACTURING VOLTAGE NONLINEAR RESISTANCE ELEMENTS

FIELD OF THE INVENTION

This invention relates to a method of manufacturing a voltage nonlinear resistance element formed by adding to a main component of zinc oxide (ZnO) auxiliary components of a rare earth element, cobalt (Co) and boron (B).

BACKGROUND OF THE INVENTION

A voltage nonlinear resistance element formed by adding a rare earth element, Co and B to a main component of ZnO is extensively employed for protecting electronic equipment from abnormal or surge voltages. The ZnO voltage nonlinear resistance element is manufactured through the steps of mixing, granulating, molding, and baking of the raw material as for conventional electronic ceramic devices. The conventional voltage nonlinear resistance element manufacturing method, however, suffers from several disadvantages. In mass-producing the voltage nonlinear resistance element, the characteristics of the elements may fluctuate within the same lot of materials. In the case of manufacturing voltage nonlinear resistance elements relatively large in outside diameter, different portions of each element often show different characteristics. These are serious problems to be solved in the manufacturing of voltage nonlinear resistance elements.

The present inventors have conducted intensive research on the above-described manufacturing steps in order to solve the related problems, and found that the baking step most seriously affects the characteristics of the element. As was described above, in manufacturing the ZnO voltage nonlinear resistance element, various elements are added, as auxiliary components, to a main component. Of these additive elements, boron (B) is used in the form of $B_2O_3$. The melting point of $B_2O_3$ is much lower than the baking temperature, and the vapor pressure thereof is high. Therefore, it has been found through analysis of the compositions of baked voltage nonlinear resistance elements that boron evaporates readily during the baking operation, and depending on the baking conditions, the distribution of boron becomes considerably non-uniform with respect to the predetermined content of boron.

Boron (B) is used to grow the crystal of ZnO. Therefore, if B evaporates partially during baking, then in the element the grain size becomes much different from the expected size. Accordingly, since the degree of evaporation of boron among the elements may differ from one another, the values V(1 mA) of the elements may also be much different from one another. The term "V(1 mA)" is intended to mean the voltage developed across the terminals of the element when a current of 1 mA flows in the element, and it is a typical measurement of the characteristic values of ZnO voltage nonlinear resistance elements. In the case of a voltage nonlinear resistance element relatively large in diameter, evaporation of boron forms different characteristics in one and the same element, thus adversely affecting the long wave tail surge withstanding data.

This difficulty may be overcome by a method in which in order to prevent the evaporation of boron, the mold is enclosed in a sheath box, i.e., it is baked in a closed container. However, this method is still disadvantageous in that the peripheral portion of the baked element will have decreased resistance, as a result of which current flows collectively in the peripheral portion, and the long wave tail surge withstanding data is decreased.

OBJECTS AND SUMMARY OF THE INVENTION

In view of the foregoing, an object of the present invention is a method for manufacturing a voltage nonlinear resistance element in which the baking operation causes a plurality of voltage nonlinear resistance elements to be consistent in characteristics form one to another, the same voltage nonlinear resistance element to have portions different in characteristics, and the long wave tail surge withstanding data to be improved.

The foregoing objects and other objects, features, and advantages of the present invention are achieved by providing a method of manufacturing a voltage nonlinear resistance element comprising the steps of providing a mixture of a main component of ZnO and auxiliary components of at least a rare earth element, Co and B in a mold, placing the mold in a sheath box having openings in the surface thereof, and baking the mold in the sheath box.

DETAILED DESCRIPTION

First, a main component of ZnO, auxiliary components of Pr, Co and B in the forms of oxides and organic binders are mixed with a ball mill to form a slurry. The slurry is sprayed and dried with a spray drier, to form spherical particles. The particles are put in a metal mold. A predetermined molding pressure is applied to the particles in the metal mold to form a modling 60 mm in diameter for instance. The molding is preferably heated at 600° C. for three hours to remove the organic binders therefrom, and then it is baked for example, at 1250° C. for three hours.

Figure 1A:
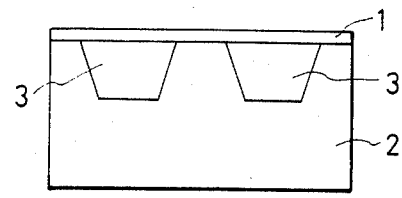
FIG. 1(a) is a diagram of an end wall of a rectangular sheath box employed in the method of the present invention.
Figure 1B:
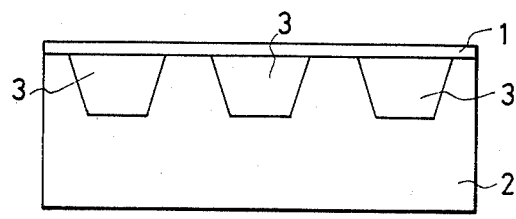
FIG. 1(b) is a diagram of a side wall of the rectangular sheath box of FIG. 1(a)

The molding is placed in a sheath box as shown in FIGS. 1(a) and 1 (b). The sheath box employed in the method of the present invention is for instance a rectangular box. FIG. 1(a) is a view showing one end wall of the sheath box which corresponds to the short side of the rectangle, and FIG. 1(b) is a view showing one side wall of the sheath box which corresponds to the long side of the rectangle.

As shown in the FIGS. 1(a) and 1 (b), the sheath box has openings 3 on the two ends and on the two sides. For example, two openings 3 may be formed on each of the two ends of the sheath box, and three openings 3 may be formed on each of the two sides. Therefore, the sheath box 2 has ten openings in total. The molding is placed in the sheath box 2 as shown in FIGS. 1(a) and 1 (b).

The reason why the sheath box 2 has a plurality of openings 3 is that if, as described above, the molding is baked in a closed sheath box, then the resistance of the peripheral portion of the resistance element is decreased, and if it is baked in a totally open environment the B evaporates with the results that the composition becomes non-uniform and the fluctuation in characteristics is unavoidable. It is, therefore, preferable that air be controllably supplied to the molding during baking.

The inventors of the present invention have conducted intensive research on the size of the openings 3 formed in the side walls of the sheath box 2. That is, the number, configuration and position of the openings were variously changed for the baking of several molded elements. Both ends of each of the molded elements thus baked were polished and connected to silver electrodes for measurement of the characteristics thereof. The results of the measurements are as indicated in FIG. 2.

Figure 2:
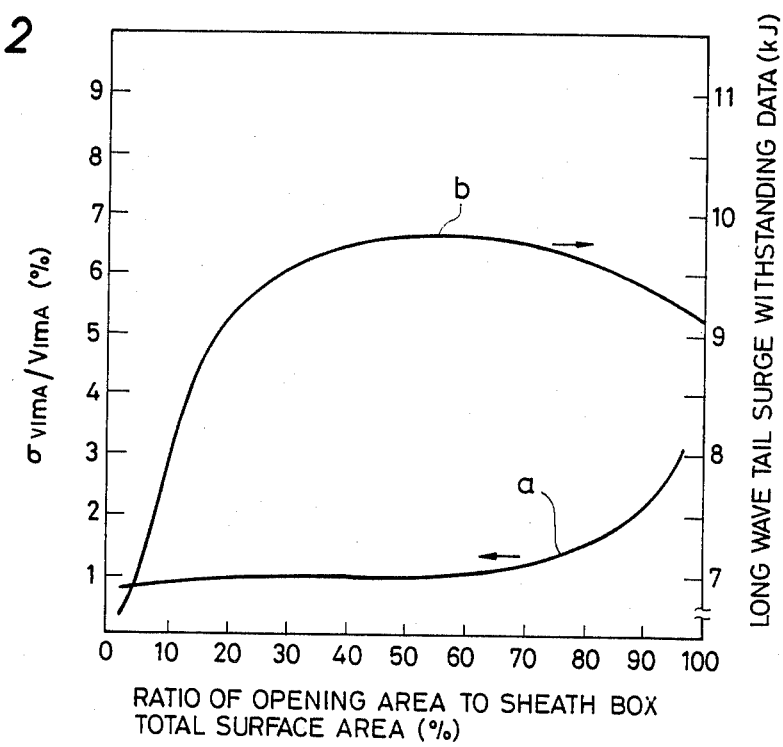
FIG. 2 is a graphical representation indicating the ratios of opening areas to total surface area with ratios of V(1 mA) values to V(1 mA) values of baked, molded objects and also indicating the ratios of opening areas to sheath box total surface areas with long tail surge withstanding data.

In FIG. 2, ratios of opening areas to sheath box total surface areas (%) are plotted on the horizontal axis, and ratios of standard difference values ($\sigma V(1\ mA)$) to $V(1\ mA)$ values (%) are plotted on one of the vertical axis. Long wave tail surge withstanding data (kJ) are plotted on the other vertical axis. Therefore, in FIG. 2, the curve (a) indicates the relationships between the ratios of opening area to sheath box total surface area and the ratios of standard difference values to $V(1\ mA)$ values. The curve (b) indicates the relationships between the ratios of opening area to sheath box total surface area and the long wave tail surge withstanding data. In FIG. 2, "100%" on the horizontal axis means that the mold is baked without using the sheath box, and "0%" means that the mold is baked in a completely closed sheath box.

As is apparent from FIG. 2, in order to insure that the baked voltage nonlinear resistance elements of one and the same lot fluctuate 2% of less in $\sigma V(1\ mA)/V(1\ mA)$, which in practice can be disregarded, the ratios of opening area to sheath box total surface area must be 90% or less. Similarly, it is apparent from the curve (b) that when the ratio of opening area to sheath box total surface area is 10% or more the long wave tail surge withstanding data is 8 kJ or higher. That is, when the ratio of opening area to sheath box total surface area is taken into consideration with respect to the fluctuation of $V(1\ mA)$, the sheath box should be closed to suppress the evaporation of B; and in order to prevent the lowering of the long wave tail surge withstanding data it is preferable that the sheath box be substantially open. The ratios of opening area to sheath box total surface area which satisfy the above-described two requirements can be determined to be in a range of from 10% to 90% from the curves (a) and (b), as was described above.

The inventors have conducted research on the number, configuration and positions of the openings formed in the side walls of the sheath, and found that these data are not as important as the ratio of opening area to sheath box total surface. In the above-described embodiment, the sheath box is made of aluminum. However, the box may be made of any material that can withstand the baking temperature and does not adversely affect the mold during baking. In view of the manufacture of the sheath box, it is desirable that the openings be arranged along the upper edges of the side walls of the sheath box as shown in FIGS. 1(a) and 1(b). It goes without saying that the sheath box is not limited in a rectangular configuration.

Heretofore, in the manufacture of a voltage nonlinear resistance element, the mold is baked in an open state or it is baked in a closed box. In the former method, an element high in vapor pressure added to manufacture the voltage nonlinear resistance element evaporates readily, thus increasing the fluctuation of $V(1\ mA)$ value. In the latter method, the long wave tail surge withstanding data is decreased. On the other hand, as is apparent from the above description, in the method of the invention, an appropriate number of openings are formed in the side walls of the sheath box, in which the molding is placed, in such a manner that the ratio of opening area to sheath box total surface area is ranged from 10% to 90%. Therefore, the mold in the sheath box is not completely closed from nor opened to the outside. That is, a suitable amount of atmosphere flows around the mold at all times during the baking period, and the fluctuation of $V(1\ mA)$ and the long wave tail surge data can be controlled to satisfactory values.

What is claimed:

1. A method of manufacturing a voltage nonlinear resistance element comprising the steps of providing a mixture of a main component ZnO and auxiliary components of at least a rare earth element, Co and B in a mold, placing the mold in a sheath box having openings in the surfaces thereof, the ratio of openings with respect to the total surface area of the sheath box being in the range of 10%–90%, and baking the mold in the sheath box.

2. The method as recited in claim 1, wherein the rare earth element is praseodymium.

* * * * *